United States Patent
Vassilieff et al.

(10) Patent No.: US 10,700,543 B2
(45) Date of Patent: Jun. 30, 2020

(54) MAGNETIC INDUCTION CHARGING DEVICE

(71) Applicants: CONTINENTAL AUTOMOTIVE FRANCE, Toulouse (FR); CONTINENTAL AUTOMOTIVE GmbH, Hannover (DE)

(72) Inventors: Youri Vassilieff, Toulouse (FR); Mohamed Cheikh, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 479 days.

(21) Appl. No.: 15/010,566

(22) Filed: Jan. 29, 2016

(65) Prior Publication Data
US 2016/0226295 A1   Aug. 4, 2016

(30) Foreign Application Priority Data
Jan. 30, 2015   (FR) ...................................... 15 50742

(51) Int. Cl.
*H02J 7/02*   (2016.01)
*H02J 5/00*   (2016.01)
*H02J 7/00*   (2006.01)

(52) U.S. Cl.
CPC .............. *H02J 7/025* (2013.01); *H02J 5/005* (2013.01); *H02J 7/0027* (2013.01)

(58) Field of Classification Search
CPC ...................................................... H02J 7/025
USPC ....................................................... 320/108
See application file for complete search history.

(56) References Cited

U.S. PATENT DOCUMENTS

| 8,916,994 B2* | 12/2014 | Jung ....................... H01F 38/14 307/104 |
| 8,933,583 B2* | 1/2015 | Uchida ................... H02J 7/025 307/11 |
| 2009/0096413 A1* | 4/2009 | Partovi ................... H01F 5/003 320/108 |
| 2011/0169338 A1* | 7/2011 | Kozakai ................. H02J 17/00 320/108 |
| 2012/0161535 A1 | 6/2012 | Jung et al. |

(Continued)

FOREIGN PATENT DOCUMENTS

| EP | 2 400 631 A1 | 12/2011 |
| EP | 2 555 377 A1 | 2/2013 |

OTHER PUBLICATIONS

French Search Report, dated Sep. 30, 2015, from corresponding French Application.

*Primary Examiner* — Edward Tso
*Assistant Examiner* — Ahmed H Omar
(74) *Attorney, Agent, or Firm* — Young & Thompson

(57) ABSTRACT

A magnetic induction charging device (50) includes an electrical power supply source (60) connected to a main coil (61). The device (50) includes passive resonant circuits (70, 80, 90, 100) of different respective resonant frequencies in a range of predetermined main frequency values. Each passive resonant circuit (70, 80, 90, 100) includes a secondary coil (71, 81, 91, 101). The secondary coils (71, 81, 91, 101) are arranged in respective different zones of the main coil (61). The electrical power supply source (60) is adapted to generate different charging signals of main frequencies in the range of predetermined main frequency values.

8 Claims, 2 Drawing Sheets

(56) References Cited

U.S. PATENT DOCUMENTS

2012/0248889 A1* 10/2012 Fukushi ............... H02J 17/00
  307/104
2012/0280575 A1* 11/2012 Kim ............... H02J 17/00
  307/104

* cited by examiner

MAGNETIC INDUCTION CHARGING DEVICE

FIELD OF THE INVENTION

The field of the invention is the field of charging via magnetic induction. In particular, the invention relates to a magnetic induction charging device comprising charging zones of different respective resonant frequencies. The invention also relates to a method for charging a receiver via magnetic induction.

BACKGROUND OF THE INVENTION

An electrical diagram of an exemplary embodiment of a magnetic induction charging device 10 according to the prior art is shown in FIG. 1. Said device 10 comprises an electrical power source 11. Said source 11 is connected to three branches in parallel. Each branch comprises a capacitor 20, 30, 40, a coil 21, 31, 41 and a switch 22, 32, 42 connected in series.

FIG. 2 shows the geometric arrangement of the three coils 21, 31, 41 of the magnetic induction charging device 10 of FIG. 1. As illustrated by FIG. 2, said coils 21, 31, 41 are geometrically associated with three distinct charging zones.

As a result of said switches 22, 32, 42, said device 10 is able to connect said source 11 to any one of the branches, thereby making it possible to supply electrical power to any one of the branches, which makes it possible to charge, via magnetic induction, a receiver placed facing any one of the coils 21, 31, 41. Said device 10 also makes it possible to connect said source 11 to two branches, for example in order to charge a receiver placed straddling two adjacent coils 21, 31, 41 of said device 10. Said device 10 also makes it possible to connect said source 11 to the three branches in order to supply electrical power to the three coils 21, 31, 41 simultaneously.

Said device 10 according to the prior art comprises drawbacks.

First of all, said device 10 comprises numerous components: three capacitors 20, 30, 40, three coils 21, 31, 41 and three switches 22, 32, 42, which make said device 10 expensive to manufacture.

Additionally, when two or three coils 21, 31, 41 are supplied with electrical power, a phenomenon of coupling between the coils 21, 31, 41 may be produced at the adjacent coils 21, 31, 41, which disrupts the charging, via magnetic induction, of a receiver placed facing one of the coils 21, 31, 41.

SUMMARY OF THE INVENTION

An objective of the present invention is to overcome, wholly or in part, drawbacks of the prior art, in particular those set out above, by proposing a solution which makes it possible to reduce the number of components used in a magnetic induction charging device and to reduce the coupling phenomenon between activated coils.

To this end and according to a first aspect, a magnetic induction charging device, comprising an electrical power supply source connected to a main coil, is proposed by the present invention. Said device comprises passive resonant circuits of different respective resonant frequencies in a range of predetermined main frequency values. Each passive resonant circuit comprises a secondary coil. Said secondary coils are arranged in respective different zones of said main coil. Said electrical power supply source is adapted to generate different charging signals of main frequencies in said range of predetermined main frequency values.

Said charging device which is a subject of the invention therefore makes it possible to change charging zone by modifying solely the main frequency of the charging signal, doing so without using a switch. Preferentially, the electrical power supply source is adapted to generate different charging signals of main frequencies respectively equal to the resonant frequencies of the different passive resonant circuits.

When said electrical power supply source generates a charging signal S0 of main frequency f0, only the passive resonant circuit which has a resonant frequency substantially equal to f0 resonates, the other passive resonant circuits are not excited.

Such provisions make it possible to activate only one zone of said main coil at a time, making it possible to reduce the losses linked to the coupling of said secondary coils of said passive resonant circuits to each other when at least two passive resonant circuits are activated.

In particular embodiments of the invention, said device may furthermore comprise one or more of the following features, taken in isolation or according to any of the technically possible combinations.

In particular embodiments of the invention, said charging device comprises at least two secondary coils arranged in respective zones of said main coil not having any overlap with each other.

Such provisions make it possible to obtain distinct zones of said main coil in which said passive resonant circuits have respectively different resonant frequencies.

According to preferred embodiments, said charging device comprises at least two secondary coils arranged in respective zones of said main coil having a partial overlap.

In preferred embodiments of the invention, said charging device comprises at least two secondary coils arranged in one and the same plane. Said same plane is advantageously parallel to a plane of said main coil.

According to an advantageous feature of the invention, said charging device comprises at least two secondary coils arranged in different planes. Said different planes are advantageously parallel to a plane of said main coil.

According to a second aspect, a method for charging a receiver via magnetic induction implementing said charging device is proposed by the present invention. Said method comprises the following steps:

successively generate charging signals of different main frequencies in said range of predetermined main frequency values, estimate, for each charging signal, a magnitude representative of a charging efficiency of said receiver, select said charging signal for said receiver as being the charging signal making it possible to maximize the charging efficiency of said receiver, charge said receiver by generating the selected charging signal.

Such provisions make it possible to localize the receiver by modifying the main frequency of the charging signal.

BRIEF DESCRIPTION OF THE DRAWINGS

The invention will be better understood upon reading the following description, given by way of entirely non-limiting example, and made in reference to the FIGS. 1 to 5 which show.

DETAILED DESCRIPTION OF THE INVENTION

In these figures, identical references are used from one figure to another to designate identical or analogous elements. For the sake of clarity, the elements shown are not to scale, unless stated otherwise.

Figure 1:
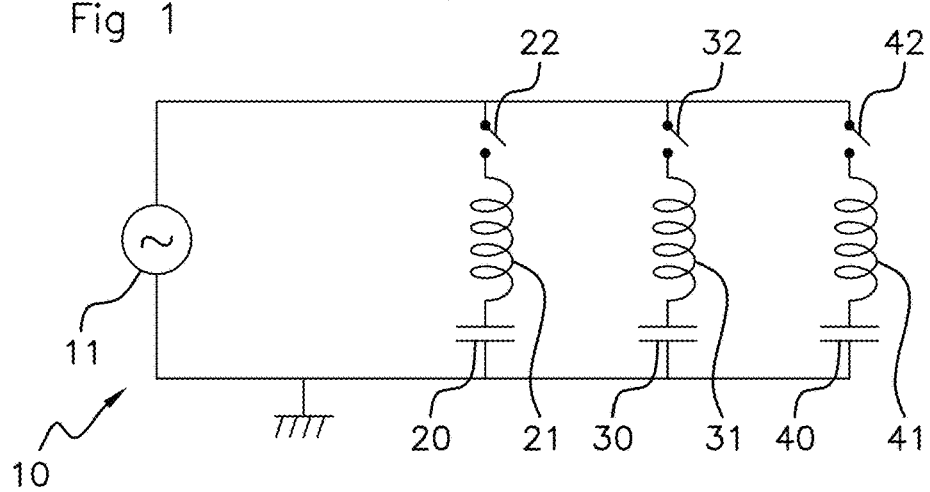
FIG. 1: a representation of an exemplary electrical diagram of a magnetic induction charging device according to the prior art.
Figure 2:
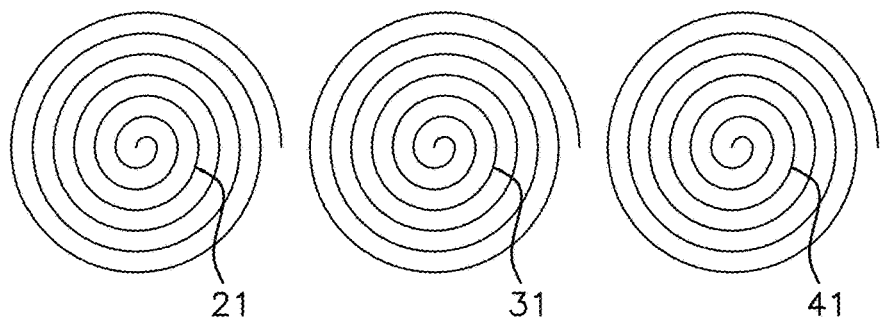
FIG. 2: an exemplary coil geometry of the magnetic induction charging device of FIG. 1 of the prior art.
Figure 3:
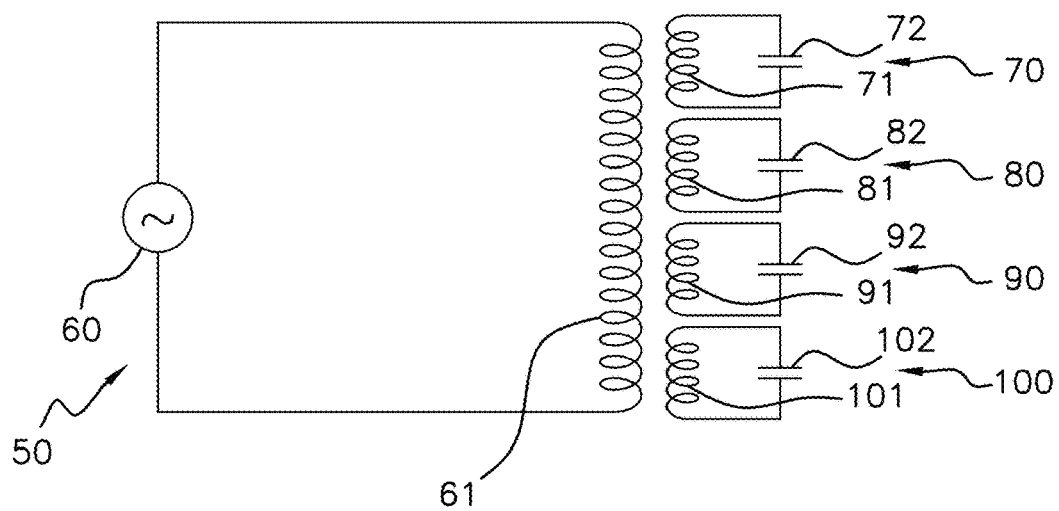
FIG. 3: a representation of an exemplary electrical diagram of a magnetic induction charging device according to the invention.

An exemplary electrical diagram of a magnetic induction charging device 50 according to the invention is shown in FIG. 3. The magnetic induction charging device 50 may for example be a device such as defined by the WPC ("Wireless Power Consortium") or by the PMA ("Power Matters Alliance").

The device 50 of FIG. 3 comprises an electrical power supply source 60 qui is connected to a main coil 61, as well as four passive resonant circuits 70, 80, 90, 100.

The electrical power supply source 60 is able successively to generate charging signals at different respective main frequencies in a range of predetermined main frequency values. In the case, for example, of a device 50 such as defined by the WPC, said range corresponds to the frequencies between 100 kHz and 200 kHz. In the case, for example, of a device 50 such as defined by the PMA, said range corresponds to the frequencies between 200 kHz and 300 kHz. In the rest of the description, the entirely non-limiting example under consideration is that of a WPC device 50, and said source 60 therefore generates charging signals at main frequencies between 100 kHz and 200 kHz. For example, said source 60 is adapted to generate successively a charging signal S0 of main frequency f0 substantially equal to 110 kHz, a charging signal 51 of main frequency f1 of about 130 kHz, a charging signal S2 of main frequency f2 of about 150 kHz, a charging signal S3 of main frequency f3 of about 170 kHz, etc.

Each passive resonant circuit 70, 80, 90, 100 comprises, for example, a secondary coil 71, 81, 91, 101 as well as a capacitor 72, 82, 92, 102. The passive resonant circuits 70, 80, 90, 100 are not supplied with electrical power by the electrical power supply source 60. Each passive resonant circuit 70, 80, 90, 100 resonates at a different resonant frequency in the range of predetermined main frequency values, i.e. between 100 kHz and 200 kHz in the example under consideration. It is to be noted that the resonant frequency of each passive resonant circuit is determined by the secondary coil and by the capacitor of said passive resonant circuit, but also by the main coil 61, due to a coupling between the main coil 61, supplied with power by the electrical power supply source 60, and said associated passive resonant circuit. The resonant frequencies of the passive resonant circuits 70, 80, 90, 100 are distinct from one another. For example, the passive resonant circuits 70, 80, 90, 100 have resonant frequencies respectively equal to the frequencies f0, f1, f2 and f3.

The device 50 comprises, in the non-limiting example of the invention of FIG. 3, four passive resonant circuits 70, 80, 90, 100. In general, the device 50 which is a subject of the invention must comprise at least two passive resonant circuits 70, 80, 90, 100 such as these, comprising secondary coils 71, 81, 91, 101 placed in different zones of the main coil 61, i.e. placed at least partially facing the main coil 61. By "placed at least partially facing the main coil", it is understood that said secondary coils 71, 81, 91, 101 are placed at least partially inside said main coil 61 or inside an extension of said main coil 61 along the axis of said main coil 61.

Figure 4:
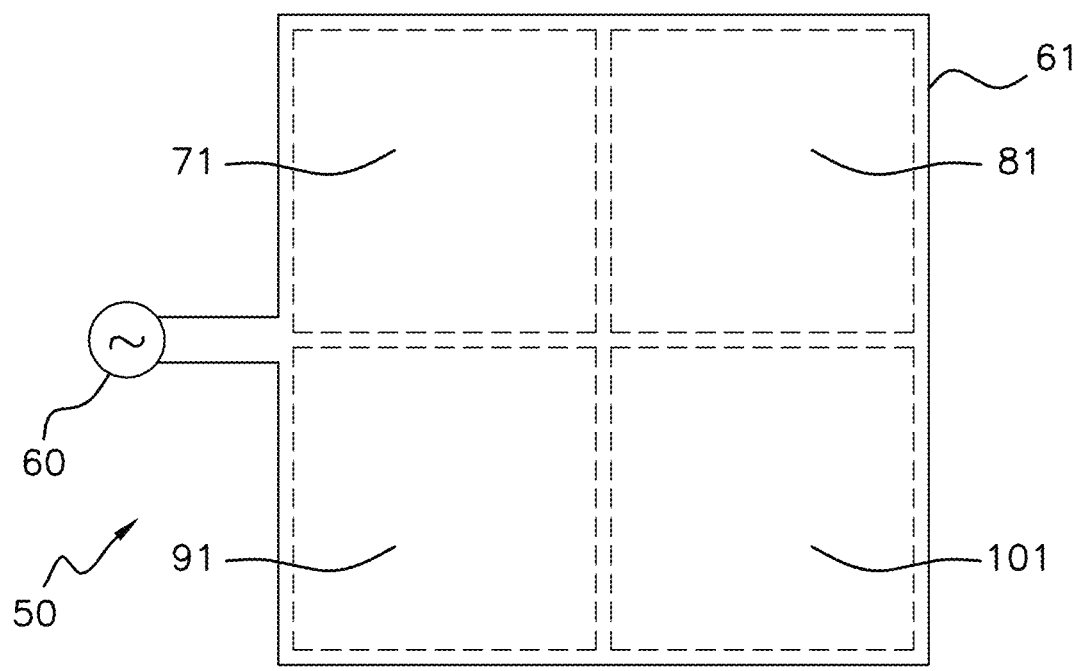
FIG. 4: a diagrammatic representation of an exemplary coil geometry of a magnetic induction charging device according to the invention.

In the preferred exemplary embodiment of the invention of FIG. 4, the four secondary coils 71, 81, 91, 101 of the passive resonant circuits 70, 80, 90, 100 divide four distinct zones of the main coil 61. In this preferred exemplary embodiment the four zones are of the same dimensions, but in other exemplary embodiments of the invention, the zones of the secondary coils 71, 81, 91, 101 of the passive resonant circuits 70, 80, 90, 100 can be of different dimensions from one another. In a preferred exemplary embodiment, the dimensions of the secondary coils 71, 81, 91, 101 of the passive resonant circuits 70, 80, 90, 100 are substantially equivalent to the dimensions of a coil of a receiver to be charged, which makes it possible to increase the charging efficiency. Indeed, the coupling between one of the secondary coils 71, 81, 91, 101 of the passive resonant circuits 70, 80, 90, 100 and between the coil of the receiver is greater when the secondary coils and the coil of the receiver are of the same dimensions.

In the preferred exemplary embodiment of the invention of FIG. 3, the four secondary coils 71, 81, 91, 101 of the passive resonant circuits 70, 80, 90, 100 lie in one and the same plane, parallel to a plane of the main coil 61 (for example on opposite sides of a printed circuit), and entirely facing said main coil 61.

In other exemplary embodiments, not shown, the four secondary coils 71, 81, 91, 101 of the passive resonant circuits 70, 80, 90, 100 lie facing the main coil 61, but the secondary coils 71, 81, 91, 101 lie in different planes parallel to each other and parallel to the plane of the main coil 61.

When the secondary coils 71, 81, 91, 101 lie in different planes parallel to each other and parallel to the plane of the main coil 61, certain zones of the secondary coils 71, 81, 91, 101 may have a partial overlap.

Figure 5:
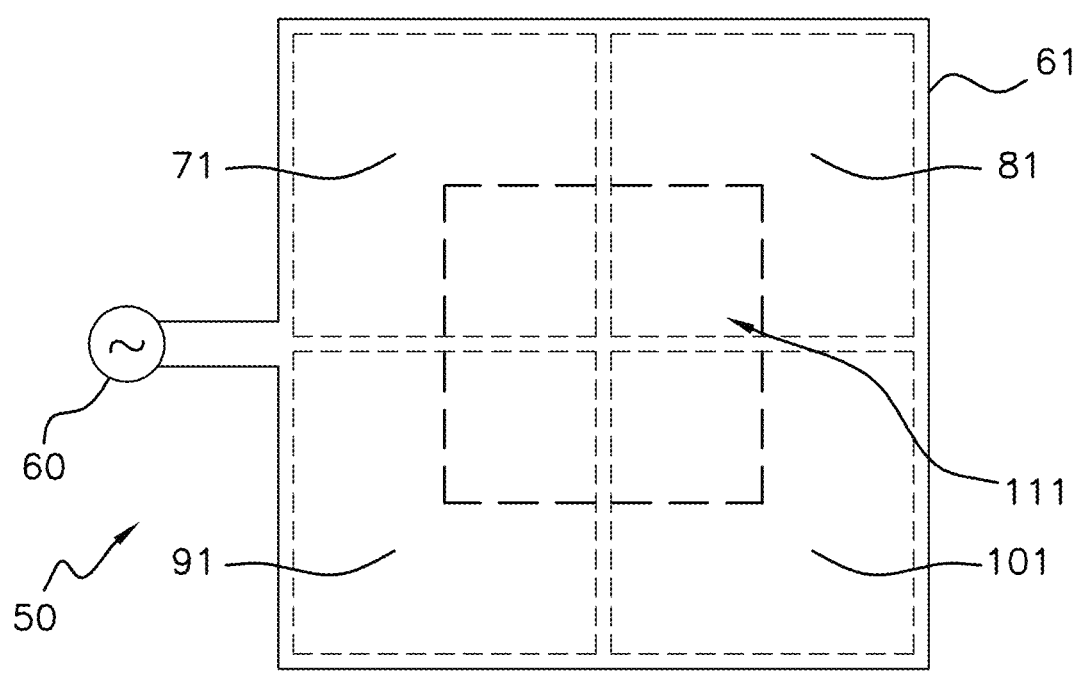
FIG. 5: a diagrammatic representation of another exemplary coil geometry, distinct from that of FIG. 4, of a magnetic induction charging device according to the invention.

In an exemplary embodiment of the invention illustrated in FIG. 5, the device 50 comprises, in addition to the four secondary coils 71, 81, 91, 101 of the passive resonant circuits 70, 80, 90, 100, a fifth secondary coil 111 of another passive resonant circuit. In the example of FIG. 5, the four secondary coils 71, 81, 91, 101 lie in one and the same plane and facing the main coil 61. In this example, the four secondary coils 71, 81, 91, 101 are of the same dimensions and each secondary coil 71, 81, 91, 101 represents ¼ of what is facing the main coil 61. Advantageously, the fifth secondary coil 111 lies in a plane parallel to the plane of the main coil 61 and in a plane distinct from that of the four secondary coils 71, 81, 91, 101. Preferentially, the fifth secondary coil 111 lies in a zone having a partial overlap with at least one of the zones of the other secondary coils 71, 81, 91, 101. In the example illustrated by FIG. 5, the fifth secondary coil 111 lies in a zone having a partial overlap with each of the zones of the other secondary coils 71, 81, 91.

The invention also relates to a method for charging a receiver via magnetic induction which implements the previously described magnetic induction charging device 50.

In the following description of implementation of the method for charging a receiver via magnetic induction, the electrical power supply source 60 generates charging signals at respective different main frequencies in a range stretching from 100 kHz to 200 kHz as in this non-limiting example of the invention, the device 50 is a WPC charging device. To illustrate this non-limiting example of the invention, the passive resonant circuits 70, 80, 90, 100 are considered to have resonant frequencies f0, f1, f2, f3 respectively equal to 110 kHz, 130 kHz, 150 kHz and 170 kHz.

The method which is a subject of the invention comprises a first step for successively generating, via the electrical power supply source 60, charging signals at different main frequencies between 100 kHz and 200 kHz.

In an exemplary implementation of the invention, the source 60 first of all generates a charging signal S0 of main frequency f0 equal to 110 kHz. Then only the passive resonant circuit 70 resonates, as its resonant frequency is 110 kHz. Therefore only the charging zone of the passive resonant circuit 70 is activated, the charging zones of the other three passive resonant circuits 80, 90, 100, which are not excited, are not activated. Next, the source 60 generates a charging signal S1 of main frequency f1 equal to 130 kHz. Then only the charging zone of the passive resonant circuit 80 is activated, because only the passive resonant circuit 80 resonates as its resonant frequency is 130 kHz. The source 60 next generates a charging signal S2 of main frequency f2 equal to 150 kHz, then a charging signal S3 of main frequency f3 equal to 170 kHz, etc.

A second step of the method which is a subject of the invention consists in the estimation, for each charging signal generated, of a magnitude representative of a charging efficiency of the receiver. The estimation of a magnitude representative of a charging efficiency of the receiver is established by taking the ratio between the power received by said receiver and the power emitted by the source 60, and may implement methods considered to be known to the person skilled in the art. For example, the WPC specification Qi, defined by the WPC, requires a charging efficiency equal to or greater than 60%, and to this end makes provision for means to verify this charging efficiency over time.

A third step of the method which is a subject of the invention consists in selecting the charging signal which makes it possible to maximize the charging efficiency of the receiver. In other words, this third step amounts to determining, out of all of the charging signals generated, the one which made it possible to obtain the greatest estimated value for the charging efficiency of the receiver. Indeed it is understood that the charging efficiency of the receiver will in principle be a maximum when the coil of said receiver is inside the activated charging zone, which depends on the main frequency of the charging signal generated. Consequently, by selecting the charging signal which makes it possible to maximize the charging efficiency, the charging zone, in which the coil of the receiver is located, is determined.

The method next comprises a fourth step consisting in charging said receiver by generating the selected charging signal.

It is to be noted that, in the above exemplary implementation, only charging signals of main frequencies equal to the resonant frequencies of the passive resonant circuits 70, 80, 90, 100 have been generated. More generally, the electrical power supply source 60 scans the range of predetermined main frequency values. Indeed, in certain cases, the maximum charging efficiency can be obtained for a main frequency which is not necessarily a resonant frequency of one of the passive resonant circuits 70, 80, 90, 100. This may be the case, in particular, when the coil of the receiver is straddling adjacent charging zones of said charging device 50.

The foregoing description clearly illustrates that through its different features and their advantages, the present invention achieves the objectives that had been set. In particular, the device which is a subject of the invention no longer comprises switches, and in particular makes it possible to reduce the coupling between activated neighboring secondary coils as, in particular, in the method which is a subject of the invention, a sole secondary coil is activated at a time.

The invention claimed is:

1. A magnetic induction charging device comprising:
an electrical power supply source connected to a single main coil; and
a plurality of passive resonant circuits of different respective resonant frequencies in a range of predetermined main frequency values, each passive resonant circuit being coupled to the single main coil, each passive resonant circuit comprising a secondary coil, said secondary coils being disposed at least partially facing the single main coil in respective different zones of the single main coil within an outer boundary of the single main coil,
the secondary coils are disposed at least partially facing the single main coil such that the secondary coils are disposed at least partially inside
wherein said electrical power supply source is configured to generate different charging signals of main frequencies in said range of predetermined main frequency values, and
wherein the secondary coils are selectively charged by modifying the charging signals, without using a switch.

2. The charging device as claimed in claim 1, wherein at least two of the secondary coils disposed in respective zones of said single main coil do not have any overlap with each other.

3. The charging device as claimed in claim 1, wherein at least two of the secondary coils disposed in respective zones of said main coil have a partial overlap.

4. The charging device as claimed in claim 1, wherein at least two of the secondary coils are disposed in one and the same plane.

5. The charging device as claimed in claim 1, wherein at least two of the secondary coils are disposed in different planes.

6. A method for charging a receiver via magnetic induction implementing said charging device as claimed in claim 1, said method comprising:
successively generating charging signals of different main frequencies in said range of predetermined main frequency values;
estimating, for each charging signal, a magnitude representative of a charging efficiency of said receiver;
selecting said charging signal to be generated for the charging of said receiver as being the charging signal making it possible to maximize the charging efficiency of said receiver; and
charging said receiver by generating the selected charging signal.

7. A magnetic induction charging device comprising:
an electrical power supply source connected to a single main coil; and a plurality of passive resonant circuits of different respective resonant frequencies in a range of predetermined main frequency values, each passive resonant circuit being coupled to the single main coil, each passive resonant circuit comprising a secondary coil, said secondary coils being disposed in respective different zones of the single main coil, wherein said electrical power supply source is configured to generate different charging signals of main frequencies in said range of predetermined main frequency values, and wherein the secondary coils are disposed at least partially facing the single main coil such that the secondary coils are disposed at least partially inside the single main coil along a longitudinal axis of the main coil.

8. A magnetic induction charging device comprising:

an electrical power supply source connected to a single main coil; and a plurality of passive resonant circuits of different respective resonant frequencies in a range of predetermined main frequency values, each passive resonant circuit being coupled to the single main coil, each passive resonant circuit comprising a secondary coil, said secondary coils being disposed in respective different zones of the single main coil, wherein said electrical power supply source is configured to generate different charging signals of main frequencies in said range of predetermined main frequency values, and wherein the secondary coils are disposed at least partially facing the single main coil such that the secondary coils are disposed at least partially inside an extension of the single main coil along a longitudinal axis of the main coil.

* * * * *